United States Patent
Urias et al.

(10) Patent No.: US 11,113,388 B2
(45) Date of Patent: Sep. 7, 2021

(54) CLOUD FORENSICS AND INCIDENT RESPONSE PLATFORM

(71) Applicant: National Technology & Engineering Solutions of Sandia, LLC, Albuquerque, NM (US)

(72) Inventors: Vincent Urias, Albuquerque, NM (US); Caleb Loverro, Albuquerque, NM (US); William M.S. Stout, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 545 days.

(21) Appl. No.: 16/051,005

(22) Filed: Jul. 31, 2018

(65) Prior Publication Data
US 2020/0042698 A1 Feb. 6, 2020

(51) Int. Cl.
*G06F 21/53* (2013.01)
*G06F 9/54* (2006.01)
*G06F 9/455* (2018.01)

(52) U.S. Cl.
CPC .......... *G06F 21/53* (2013.01); *G06F 9/45558* (2013.01); *G06F 9/542* (2013.01); *G06F 9/545* (2013.01); *G06F 2009/45587* (2013.01); *G06F 2009/45591* (2013.01); *G06F 2009/45595* (2013.01)

(58) Field of Classification Search
CPC ...... G06F 21/53; G06F 9/45558; G06F 9/542; G06F 9/545; G06F 2009/45587; G06F 2009/45591; G06F 2009/45595
See application file for complete search history.

(56) References Cited

U.S. PATENT DOCUMENTS

| 10,142,290 | B1* | 11/2018 | Brandwine | H04L 63/0263 |
| 2011/0191533 | A1* | 8/2011 | Coulter | G06Q 10/00 711/112 |
| 2012/0272015 | A1* | 10/2012 | Fahrig | G06F 9/45533 711/153 |
| 2013/0346977 | A1* | 12/2013 | Rasmusson | G06F 9/45533 718/1 |
| 2014/0208166 | A1* | 7/2014 | Eck | G06F 11/0793 714/37 |

(Continued)

OTHER PUBLICATIONS

Patrascu et al. "Logging Framework for Cloud Computing Forensic Environments"; Published in Communications (COMM), 2014 10th International Conference on May 31, 2014 (Patrascu_2014.pdf; pp. 1-4) (Year: 2014).*

(Continued)

*Primary Examiner* — Saleh Najjar
*Assistant Examiner* — Devin E Almeida
(74) *Attorney, Agent, or Firm* — Yee & Associates, P.C.

(57) ABSTRACT

A system, method, and device for cloud forensics and incident response is provided. In an embodiment, a computer-implemented method for performing cloud forensics and incident response includes intercepting, by a cloud incident response module (CIRM), communication between a virtual machine (VM) and a hypervisor. The method also includes extracting, by the CIRM, data from the communication between the VM and the hypervisor according to a forensic policy. Intercepting and extracting the data are transparent to the VM and to the hypervisor. Intercepting and extracting the data are independent of the VM and the hypervisor.

21 Claims, 7 Drawing Sheets

(56) References Cited

U.S. PATENT DOCUMENTS

2014/0259169 A1* 9/2014 Harrison ............... G06F 21/554
726/23
2016/0034295 A1* 2/2016 Cochran ............. G06F 9/45558
718/1

OTHER PUBLICATIONS

Alqahtany, S. et al., "Cloud Forensics: A Review of Challenges, Solutions and Open Problems," International Conference on Cloud Computing (ICCC), IEEE (2015) pp. 88-96.

Farina, J. et al. "Overview of the Forensic Investigation of Cloud Services," 10th International Conference on Availability, Reliability and Security (ARES 2015), Toulouse, France, IEEE, 11 pages (DOI: 10.1109/ARES.2015.81).

Katilu, V.M. et al., "Challenges of Data Provenance for Cloud Forensic Investigations," IEEE, 2015 10th International Conference on Availability, Reliability and Security, (ARES), Toulouse, France, pp. 312-317 (DOI: 10.1109/ARES.2015.54).

Manoj, S.K.A. and Bhaskari, D.L., "Cloud Forensics—A Framework for Investigating Cyber Attacks in Cloud Environment," Procedia Computer Science (2016), vol. 85, pp. 149-154.

Patrascu, A. and Patriciu, V-V., "Beyond Digital Forensics. A Cloud Computing Perspective Over Incident Response and Reporting", 2013 IEEE 8th International Symposium on Applied Computational Intelligence and Informatics (SACI), pp. 455-460 ( DOI: 10.1109/SACI.2013.6609018).

Pichan, A.R., et al., "Cloud Forensics: Technical Challenges, Solutions and Comparative Analysis," Digital Investigation, vol. 13 (2015), pp. 38-57.

Rahman, N.H.A. and Choo, K-K.R., "A Survey of Information Security Incident Handling in the Cloud," Computers and Security, vol. 49 (2015), pp. 45-69.

Roussev, V. et al. "Cloud Forensics—Tool Development Studies & Future Outlook." Digital Investigation, vol. 18 (2016), pp. 79-95.

\* cited by examiner

702

1460340185, dpi_log, path=base.ip.udp.dns, srcip=[_____].66, dstip=[_____].82, udp_port_src=53, udp_port_dst=54799, bytes=396, packets=5, metadata="query:attacker.com, name:attacker.com, addr: [_____].2"
host = blue3 | source = /tmp/flow_logs/dpilog.log | sourcetype = dpi_log

1460340189, dpi_log, path=base.ip.tcp.http.silverlight, scrip=[_____].2, dstip=[_____].82, tcp_port_src=8080, tcp_port_dst=49211, bytes=149385, packets=193, metadata="mime-type:application/x-silverlight-2"
host = blue3 | source = /tmp/flow_logs/dpilog.log | sourcetype = dpi_log

1460340194.32, kvmi_newproc, host_pid=60f0, vpid=11, eproc_hva=7f4306e68b30, peb_hva=7f42ccc48000, peb64=7efdf000, peb32=7efde000, cr3=13fd7000, pid=840, wow641, name="notepad.exe"
host = blue3 | source = /tmp/kvmi_logs/kvmi_newproc | sourcetype = kvmi_newproc

1460340204.11, kvmi_apihooks, host_pid60f0, vpid11, function="notepad.exe:ntdll.dll: NtCreateFile(PHANDLE:399e7b8, '\??\C: \Users\win7\Desktop\binary.exe' )"
host = blue3 | source = /tmp/kvmi_logs/kvmi_apihooks | sourcetype = kvmi_apihooks

1460340205.11, kvmi_apihooks, host_pid=60f0, vpid=11, function="explorer.exe:ntdll.dll
:NtCreateFile(PHANDLE:3c4db28, '\??\C: \Users\win7\Desktop' )"
host = blue3 | source = /tmp/kvmi_logs/kvmi_apihooks | sourcetype = kvmi_apihooks

1460340316, dpi_log, path=base.ip.tcp.http, srcip=☐.82, dstip=☐.2, tcp
_port_src=49215, tcp_port_dst=2222, bytes=12739, packets=76, metadata="full-uri:/_1Bi2n
ZvZkH4aflor2L9sQP7EaFbHF0I_4HnTAWJPfKXLtn4c73EVfnRKPRxhcd_2hU2dIsoFt_T7b-tMI-QQ7erS
DA7-0W87dEGBF8HeiqdPARmJ/, server:attacker.com"
host = blue3 | source = /tmp/flow_logs/dpilog.log | sourcetype = dpi_log

1460340265.7, flow_log, event=delete_flow, dpid=9a - 7b-ad-72-91-45, vlan=100, srcip=☐.
☐.66, dstip=☐.2, nwproto=6, srcport3333, dstport=36857, duration=13, pack
et_count=65, byte_count=23010
host = blue3 | source = /tmp/flow_logs/flowlog.log | sourcetype = flow_log

FIG. 7G

716 host_pid=c27, vpid=0, pid=1fc, process=svchost.exe, function="BIND:0.0.0.0:0"
host_pid=c27, vpid=0, pid=720, process=iexplore.exe, function="BIND:0.0.0.0:0"
host_pid=c27, vpid=0, pid=720, process=iexplore.exe, function="CONNECT:☐.33:80"
host_pid=c27, vpid=0, pid=1fc, process=svchost.exe, function="BIND:0.0.0.0:0"
host_pid=c27, vpid=0, pid=338, process=iexplore.exe, function="BIND:0.0.0.0:0"
host_pid=c27, vpid=0, pid=338, process=iexplore.exe, function="CONNECT:☐.33:80"
host_pid=c27, vpid=0, pid=1fc, process=svchost.exe, function="BIND:0.0.0.0:0"

FIG. 7H

CLOUD FORENSICS AND INCIDENT RESPONSE PLATFORM

STATEMENT OF GOVERNMENT INTEREST

This invention was made with United States Government support under Contract No. DE-NA0003525 between National Technology and Engineering Solutions of Sandia, LLC and the United States Department of Energy. The United States Government has certain rights in this invention.

BACKGROUND

1. Field

The disclosure relates generally to data processing systems and more specifically to methods, systems, and devices for performing forensic analysis in a cloud environment.

2. Description of the Related Art

The Cloud has been leveraged for many applications by many different industries. Despite its popularity, cloud technologies are still not well understood and are open for research and development. The security implications of cloud computing are a critical topic requiring additional research. From a forensic perspective, numerous questions arise on how to analyze the Cloud using traditional digital forensics techniques. For instance, during a traditional digital forensic examination, all files on the storage media are examined along with the entire file system structure. However, this is not a practical model for cloud infrastructure, as the elasticity and ephemerality of pooled storage make pinpointing data blocks cumbersome. This difficulty is exacerbated in networked systems by the scale with which computing resources are spread over diverse administrative and geopolitical domains. Cloud is able to combine numerous heterogeneous resources (hardware platforms, storage back ends, file systems) that may be geographically distributed. The idiosyncrasies in cloud have caused a paradigm shift in digital forensics; however, tools and techniques still do not exist to help forensic practitioners cope with these issues. And while many research areas enumerate these challenges, open literature has not made significant headway to address the issues them or provide solutions.

Therefore, it would be desirable to have a method and apparatus that take into account at least some of the issues discussed above, as well as other possible issues. For example, it would be desirable to have a method and apparatus that overcome the problem with cloud forensics.

SUMMARY

According to one embodiment of the present invention, a computer-implemented method for performing cloud forensics and incident response includes intercepting, by a cloud incident response module (CIRM), communication between a virtual machine (VM) and a hypervisor. The method also includes extracting, by the CIRM, data from the communication between the VM and the hypervisor according to a forensic policy. Intercepting and extracting the data are transparent to the VM and to the hypervisor. Intercepting and extracting the data are performed without knowledge of the operating environment of the VM and of the hypervisor.

In an embodiment, a computer system for performing cloud forensics and incident response includes a bus system, a storage device connected to the bus system, and a processor connected to the bus system. The storage device stores program instructions. The processor executes the program instructions to intercept communication between a virtual machine (VM) and a hypervisor. The processor also executes the program instructions to extract data from the communication between the VM and the hypervisor according to a forensic policy. Intercepting and extracting the data are transparent to the VM and to the hypervisor. Intercepting and extracting the data are performed without knowledge of the operating environment of the VM and of the hypervisor.

In an embodiment, a computer program product for performing cloud forensics and incident response includes a computer readable storage medium having program instructions embodied therewith. The program instructions are executable by a computer to cause the computer to perform a method for cloud forensics and incident response. The method includes intercepting communication between a virtual machine (VM) and a hypervisor. The method also includes extracting data from the communication between the VM and the hypervisor according to a forensic policy. Intercepting and extracting the data are transparent to the VM and to the hypervisor. Intercepting and extracting the data are performed without knowledge of the operating environment of the VM and of the hypervisor.

BRIEF DESCRIPTION OF THE DRAWINGS

FIGS. 7A-7H are forensic logs illustrating the use of illustrative embodiments of cloud incident and response monitoring.

DETAILED DESCRIPTION

Figure 1:
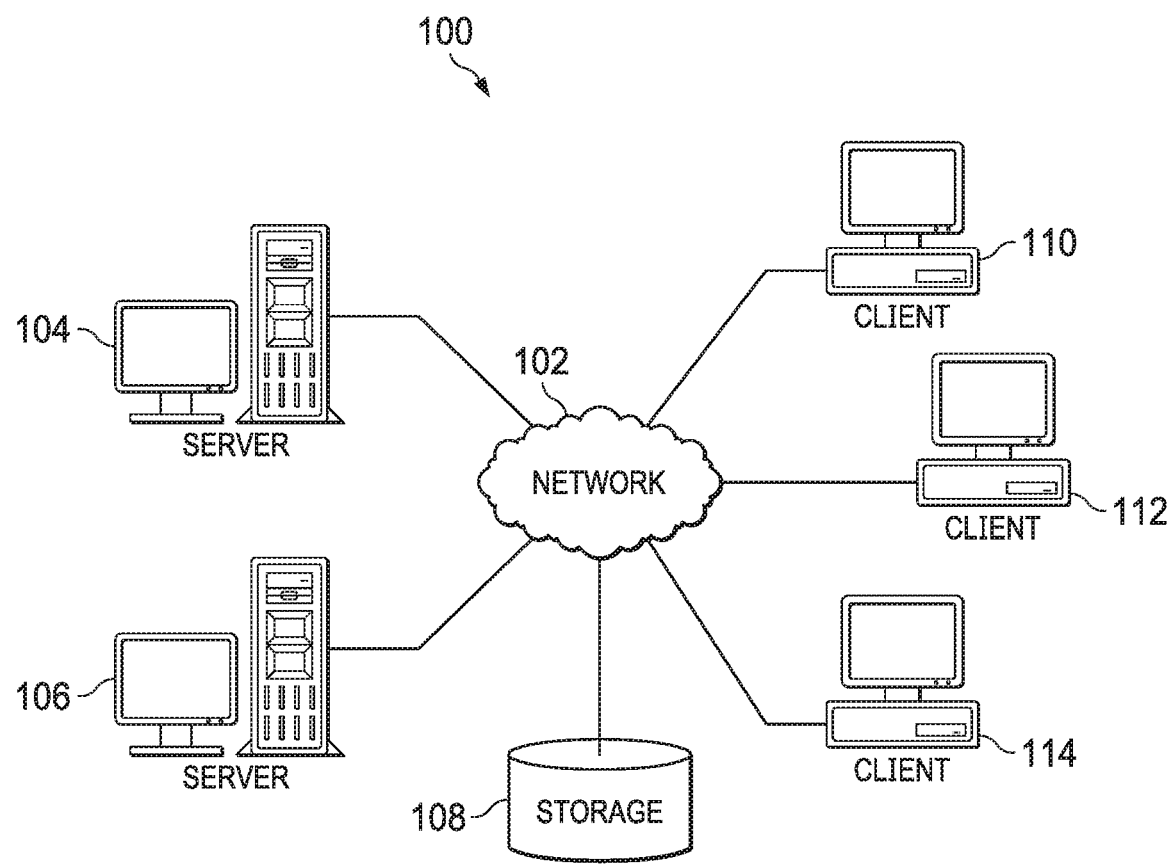
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a virtual machine (VM) is an emulation of a computer system. A VM may be an operating system (OS) or application environment that is installed on software that imitates dedicated hardware. The end user has the same experience on a virtual machine as they would have on dedicated hardware. Specialized software called a hypervisor emulates the PC client's or server's central processing unit (CPU), memory, hard disk, network, and other hardware resources completely, enabling virtual machines to share the same physical resources on a single physical data processing system. The hypervisor can emulate multiple virtual hardware platforms that are isolated from each other allowing virtual machines to run different operating systems on the same underlying physical host.

Cloud computing has been integrated into many areas of production and received a great amount of attention from both government and private industry. Despite its popularity, cloud technologies are still not well understood and numerous areas are open for research and development. Once critical area that has not received significant attention in the security domain of cloud computing is digital forensics and incident response. Disclosed herein are systems, methods, and devices that address the challenges in those domains by introducing a novel approach using virtual machine introspection to provide an on-demand, loadable, guest agnostic, hypervisor agnostic, introspection platform for off-premises and on-premises cloud systems.

The National Institute for Standards and Technology (NIST) defines cloud computing as "a model for enabling ubiquitous, convenient, on demand network access to a shared pool of configurable computing resources (e.g., networks, servers, storage, applications, and services) that can be rapidly provisioned and released with minimal management effort or service provider interaction". A few businesses have emerged as leaders as cloud computing has become increasingly mature and available. Amazon, Google and Microsoft have demonstrated support through the promotion, encouragement, adoption, and leadership of cloud computing, building a foundation for recent paradigm shifts. The paradigm will continue to evolve as the Cloud becomes more pervasive. The promise of cloud computing has spurred entrepreneurial development of cloud services. The services provided by these businesses are generally divided into three categories:

Software as a Service (SaaS)
Platform as a Service (PaaS)
Infrastructure as a Service (IaaS)

With both SaaS and PaaS, cloud providers often have tight control of the execution environments, as the applications that users access are limited in the number of configurable options. However, cloud providers of the infrastructure component, IaaS, often have much less control over the execution environments. There are several IaaS platforms, such as, for example, OpenStack, OpenShift, and EC2, as well as providers in both private and public settings. IaaS provides users with the most freedom of configuration for their virtual environments, comparable to what they would have in their own enterprises. However, just as in traditional networks, IaaS is not immune to malicious actors that take advantage of poor security policies, weak credentialing, and multitenancy. While the rapid elasticity of IaaS provides the greatest return on investment, the ephemeral nature of data in the cloud does not lend itself well to forensic investigation following compromises, breaches and attacks. Still, companies and government sectors have made the cloud part of their long-term strategic plans to leverage cloud technologies for their infrastructures. As cloud computing, and specifically IaaS, become more ubiquitous, it becomes more imperative to address the challenges of digital forensics and incident responses to, for example, compromises, breaches, and attacks to the cloud infrastructure.

There have been many inquiries into the ability of forensic practitioners to conduct the science of digital forensics in cloud-based infrastructure and the ability for the current tools and techniques of digital forensics to operate in the cloud. The Cloud infrastructure—with its distributed processing, storage, and resources—can be extremely complex because storage capacities can grow geometrically. Before understanding the applicability of current digital forensics practices to the Cloud, it is beneficial to construct a common understanding of digital forensics.

Informally, digital forensics is defined as "the collection of techniques and tools used to find evidence in a computer." It is often considered a science due to its systematic, technological approach toward inspecting a computer system and its contents. Its aim is to locate and preserve electronic evidence for use in criminal investigations. It may also be used for other purposes such as investigating problems or incidents with the software and/or hardware used by the cloud host. Digital forensic investigations require a level of expertise and rigorous methodology that exceed standard data collection and preservation routinely performed by system administration personnel.

Digital forensics, as a scientific discipline, is concerned with the collection, analysis and interpretation of digital data connected to a computer security incident, as well as crimes that involve a digital device that may store electronic information. Practitioners have attempted to provide some formalization to the field by defining a five-phase process:
1) Identification of an incident from its source(s) and determine its type.
2) Acquisition of evidence from various sources.
3) Preservation of the state of evidential data.
4) Analysis of evidential data, reconstructing fragments, and drawing conclusions.
5) Reporting of results and conclusions about the evidence.

This standard unifies many of the previous forensic protocols and provides an abstraction to the process that is not focused on a particular tool or technology, nor is bound to a specific class of cyber-crimes. During a forensic examination, all files (e.g., storage, log files), memory, and external media are examined along with the entire file system structure to locate forensic artifacts. However, each of the phases provides unique challenges and opportunities for investigators as cases and artifacts are situated in the Cloud. Numerous papers have discussed the challenges to current hard-disk-based forensics approaches. To date, the predominant focus has been on challenges and solutions in in the network forensics subdiscipline (which focuses on forensics of network traffic, rather than hard disk forensics). In the prior art, there is a gap in the ability to conduct the preservation and analysis of hard-disk forensics in the cloud. Efforts have been made, but do not address the area and do not provide a significant improvement or methodology in this area.

It is an insight of this disclosure that there is some overlap in the goals and approaches in conducting digital forensics and in incident response. National Institute and Standard Technology (NIST) defines incident handling as a lifecycle that includes incident response, includes preparation, detection/analysis, containment, eradication and recovery. Incident management may include responding to an incident (cyber), vulnerability and artifact handling, and other related services.

There are many parallels between the steps in incident handling and the forensics phases of the incident response life cycle. With the focus on creating forensic artifacts that are actionable, there are limited tools, methods and approaches that enable the collection and preservation of forensic evidence in the Cloud. Both approaches and disciplines face similar challenges in the need to interact with the system in a transparent, non-intrusive fashion. In order to contain, collect and analyze evidence, both areas are demanding that advancements and tools be written to aid in their approaches.

Some of the most attractive benefits for cloud computing involve a subscriber's ability to receive services from a broker or provider and to expand their requirements at scale. The burden of scaling is placed on the broker or provider and becomes transparent to the user. Coupled with this is the economic perk that subscribers need only pay for what they use (i.e., pay as-you-go), forgoing the operations and maintenance costs that would normally accompany an on-premises data center. However, incorporating cloud infrastructure into a company's network may alter its threat surface and appear contrary to security and privacy controls implemented for boundary protection. Cloud computing presents the risk of shared computing resources among multiple tenants on the same physical hardware. Thus, there is a need to have strict software isolation in order to prevent one tenant's software from compromising another tenant. For IaaS, a lack of proper VM separation severely elevates this risk.

For data protection, providers and administrators must ensure only authorized users have access to their data, and that their data is protected at rest, then sufficiently isolated and permanently erased during data sanitization. When security incidents occur in violation of risk-reduction controls, the challenges involved in the cloud incident response and forensics begin to manifest. The notion and risk of acquisition changes within virtualized environments. Without physical queues and devices, it may no longer be feasible to physically protect against contamination of the machine through a "write-blocker." In traditional networks, the analyst physically removes the drive to create a bit-to-bit image of the device. In the cloud, analysts may be bound to the network that the VM is on. As a consequence, investigations are more dependent on the surrounding infrastructure than physical machines.

The elasticity of cloud relies on the dynamic allocation of physical resources. Difficulty arises if the geographic location of an examiner is drastically removed from one or many servers involved in an incident. What if the analyst is attempting acquisition from the device when the physical network interface card goes down? If the analysts must now remove the drives, they must acquire the entire device in order to acquire the specific image that they were looking for, increasing processing time. Furthermore, with the advent of container-based technology, batch processes may be run concurrently in containerized applications, which are abruptly decommissioned following task completion. Additionally, there are legal implications with regard to other data which may be tangentially acquired (intentionally or incidentally).

The notion of forensically sound images is also a challenge, particularly source images. Will the service provider have to store the image/backup on their system until the case is resolved to ensure image integrity/attribution? Or, will a hash of the VM compared to the other VM be enough to satisfy the requirement of producing the source evidence in the court? Such circumstances will leave the analyst dependent on the backup strategies of the service provider, which may vary from cloud to cloud, and may not always be viable.

The identification of possible roadblocks in conducting cloud forensics is a daunting task. In an aspect, these challenges are effectively categorized into nine major groups:
1) Architecture: diversity, complexity, provenance, multitenancy, data segregation.
2) Data collection: data integrity, data recovery, data location, imaging.
3) Analysis: correlation, reconstruction, time sync, logs, metadata, timelines.
4) Anti-forensics: obfuscation, data hiding, malware.
5) Incident first responders: trustworthiness of cloud providers, response time, reconstruction.
6) Role management: data owners, identity management, users, access control.
7) Legal: jurisdiction, laws, service level agreements (SLAs), contracts, subpoenas, international cooperation, privacy, ethics.
8) Standards: operating procedures, interoperability, testing, validation.
9) Training: forensic investigators, cloud providers, qualification, certification.

The first four groups are the most technology dependent. One thing that is troublesome regarding the first four groups is the dependence on media and/or disk-based forensic analysis. The identification, collection and preservation of physical media to capture incident evidence and artifacts in a cloud environment are difficult and sometimes impossible. These shortcomings are promulgated by varying cloud providers, improper identification of cloud user accounts, gaining assistance from cloud staff, system understanding, volume of data and noise, data location, privacy issues (multitenant data), and encryption.

In an embodiment, to alleviate some of the issues of media, disk, data temporality, location and ownership in the Cloud infrastructure, logging is leveraged to detail the events that occur in their domains. In an exemplary embodiment, these logs include: (1) audit logs that may correlate services to operating systems, (2) security logs that may attempt to connect users to broad actions, and (3) application logs that highlight cloud application activity. However, these logs often suffer from the semantic gap problem due to the lack visibility into the VM, where the events take place. The common denominator in any IaaS-based environment is the hypervisor. A hypervisor (also referred to as a virtual machine monitor (VMM)) is computer software, firmware, and/or hardware that creates and runs VMs. Examples of hypervisors include Xen, VMware, and Kernel-based Virtual Machines (KVMs).

In an embodiment, many of the deficiencies with cloud forensics may be addressed by tapping the hypervisor for VM introspection (VMI); that is, uncovering forensic artifacts at the virtual machine manager (VMM) layer. In an embodiment, logs are used in hypervisors to provide digital forensics and incident response.

As systems and devices become virtualized and deployed in the cloud, the hypervisor becomes an increasingly appropriate place to collect performance data, system state, system landscape, function calls, transaction traces, and other characteristics. Disclosed herein is a method by which an introspection application is coupled with a hypervisor, in order to "reach into" the VM with minimal intrusiveness to collect data critical to the reconstruction of events, files, and operations. Such a capability is beneficial to take advantage of the hypervisor as an instrumentation platform and to integrate that data with more traditional collection mechanisms.

The concept of a VM serviced by a lightweight hypervisor is a relatively new paradigm for forensic practitioners. Traditional forensic techniques, based on assumptions that the filesystem was directly interacting with the hardware through an abstraction, afforded the forensic practitioner the assumption that there was nothing controlling the application below the file-system. This is not the case when using virtualized technologies. It is an insight of this disclosure that hypervisors have the ability to covertly monitor, introspect and interact with the guest in a transparent fashion. As mentioned in previous sections, the problems of storage and collection of actionable data are exhausting.

The current challenge is most hypervisors do not expose a useful application programming interface (API) at a sufficient level to do transparent, fine-grained and customizable introspection. Scalable VM instrumentation and introspection at an in-depth level requires fast handling of events, as well as direct access to VM state. Furthermore, deep introspection benefits greatly from the ability to gather data from the hardware during the VM's exit to the hypervisor. All of this requires identical access to the system as the hypervisor itself. Improper use of this ability could easily cause system instability. It is believed that this is a reason that the hypervisor developers have been hesitant to grant this much control through their APIs. However, the disclosed systems, methods, and apparatuses leverage other means to collect and monitor the guests in a targeted fashion.

Since the hypervisor is the means through which cloud is managed, IT security professionals are concerned it may be leveraged as a vector to present attacks or unauthorized access to the virtual systems. However, it is an insight of this disclosure that since the cloud incident response module (CIRM) is decoupled from the hypervisor, the CIRM can be used to detect, stifle, or block attacks.

Virtual machine introspection (VMI) is a technique used to monitor the runtime state of a system-level virtual machine. The runtime state can be may include processor registers, memory, disk, network, and any other hardware-level events. A review of research literature and current VMI technologies exposed a number of limitations and trade-offs in VMI approaches, including: the use of in-guest agents; kernel to user space transitions (dramatically slowing down processing); VMI tool pre-configuration requirements; hypervisor version lock-in or source code patching; reliance on operating system (OS) symbols; limited processor features due to hypervisor (even if the hardware could do more).

To address these constraints, a VMI tool was envisioned to provide the cloud forensic capabilities while having as few of these limitations as possible. The CIRM was developed to be hypervisor agnostic on Intel's x86 architecture. However, although described with reference to Intel's x86 architecture, the disclosed methods, systems, and apparatuses are not limited to such architectures, but may be applied to many different types of computer architecture. In an embodiment, to meet performance, scooping and use case demands, in an embodiment, the follow tenets were applied to the CIRM:

Shall not require in-guest agents.
Shall work with any recent version of a supported hypervisor.
Shall work with modern computer operating systems, such as, for example Windows 7 64-bit, including newer versions such as Windows 10 64-bit
Shall not require OS symbol files
Shall be able to fully handle VM-exits, bypassing execution of the hypervisor if necessary, to facilitate new features the hypervisor may not support.
Shall be compilable/loadable on a running system with standard build tools.

Disclosed herein is a cloud incident response module (CIRM). In an exemplary embodiment, the CIRM is implemented as a single loadable kernel module for Linux and other hypervisor host platforms. The process for forensic analysis and incident response using the CIRM begins by locating the hypervisor and the intel kernel modules in kernel-space memory. Upon finding them, the CIRM hooks code in the hypervisor's exit handler redirecting exit handling of the VM from the hypervisor to a CIRM exit handler. Thus, the code redirects execution into the CIRM's own exit handler. When the CIRM encounters a new VM, the CIRM determines the VM's operating system and adds the system of interest to a set for further introspection. The VMs then run until an operation within the guest causes them to VM-exit, which then passes control to CIRM's VM-exit handler routine, providing the foundation to understand the dynamic behavior of actors within the virtual machine, introspect without introducing artifacts into the running system, and allow full control over the guest system.

In an exemplary embodiment, each VM of interest is dynamically analyzed to determine offsets of key structures in memory. This is done in multiple ways, including parsing file formats such as PE and ELF, disassembling code, and simple recognition of data in relation to other objects. It also utilizes VM exits for things like control-register access, model specific register (MSR) access, CPUID, and timer related exits. CIRM also keeps track of each virtual CPU separately, and links them to their respective VM. For breakpoints, it uses permissions in Intel's extended-page-tables (EPT) to trap on read, write, or execution on arbitrary sized chunks of memory. It leverages the monitor-trap-flag (MTF) bit for single stepping. The CIRM produces a log-based output through, for example, ring buffered character devices on the host's device file system. In one or more embodiments, the CIRM may receive select input through this method as well.

To support forensic analysis of incidents on and from guests, in an embodiment, the CIRM provides:
Reconstruction of dynamic linked libraries and drivers (lists as well as full reconstructions out of memory)
File reconstruction
Guests process lists (includes parsing the ELF or PE files of all modules loaded in each process to find functions of interest)
Guest system call logging
Guest operating system function calls and parameters
Memory access In an embodiment, the CIRM has the ability to make modifications to the guest system, such as hiding or changing guest files in memory, or redirecting execution. Because CIRM has this ability, an administrator may run arbitrary code in the kernel or user space processes directly from the hypervisor without any in-guest agent or user logged in. In an embodiment, such a capability is used to support live, forensic data collection.

Most hypervisor platforms allow some interaction through an API. They can range from simple things like querying the power status of VMs, to more complex things like viewing or modifying register state inside a guest. In all cases, a considerable amount of overhead is incurred. The APIs for hypervisors like Xen or VMware require ring switches and transfers between the hypervisor and a special VM (Dom0 or secure virtual machine (SVM) respectively). This effectively separates the actual hypervisor kernel from bugs in the VMI code. However, it also causes any introspection data to travel far from the hypervisor kernel before it reaches the VMI code. Additionally, it enables hypervisor authors to decide what data is relevant to the VMI code. This separation is advantageous for the hypervisor, but at best neutral for the VMI code, and only if it is able to get all the data that it needs. The VMI code can request additional information, but this requires even more context switching, and is still limited to what the hypervisor will allow it to request. The VMI code will not be running in VMX root mode and thus does not have the ability to use virtual machine extensions directly. In some cases, APIs to do certain tasks don't exist, and thus the only way to do some types of introspection is to patch or hook the hypervisor code and obtain VMX root privileges. For example, it is not possible to ask KVM to enable the MTF (monitor trap flag) functionality of Intel hardware virtualization to single-step a guest.

Actions such as extracting large buffers of data from frequently used system calls or other functions require considerable overhead to process, and thus must be handled in the most efficient manner. When a guest VM-exits to the hypervisor, it is in a suspended state on the CPU core which has exited. When the hypervisor takes too long to do its processing during the exit, a noticeable lag can be seen by users in the guest VM. Since the CIRM hooks the hypervisor to gain execution in VMX root mode, it is also running in this window during the VMexit. The CIRM has two interfaces for users to interact with, a set of character devices, and a sysfs tree. In both cases, the data given to the user is stored inside a kernel buffer. When the data is captured by the CIRM, it performs a copy from the VM's buffer into the kernel buffer and immediately lets the guest resume. No other communication takes place during the exit. With both character device and pseudo file system (sysfs) interfaces, the user requests the data at his or her leisure, and it is copied to them outside of VMX root mode. No ring switching or VM transitions occur other than the one required VM-exit and VM-enter (which would have happened even without the hooking). With this method, the CIRM is able to move data from the VM to the host with minimal overhead.

With the advent of cloud computing and virtualization, special care needs to be taken by the data center, cloud service provider, and the cloud architect to ensure the tenant's (intellectual) property is secure. Cloud computing changes the relationship between the computer hardware and the operating system that manages and controls it. It is an insight of this disclosure that focusing on the added virtual layer is not enough. Furthermore, it is an insight of this disclose that with the CIRM, one can look at the hypervisor and to ways to more tightly secure it.

1) Personnel Security: Today with companies, governments and organizations choose to host services and store information on the cloud (both public and private), the physical access to their digital property will be inevitably lost. Because of this risk, the possibility of data being exposed to attack is higher. The biggest threat to sensitive data will possibly come from individuals or groups inside the data center. Therefore, it should be put on the cloud services provider to secure the system, software and data through background checks of data center personnel. Thus, in an embodiment, access to the CIRM application is restricted and controlled based on detailed roles of the individual.

2) System Security: The cloud service providers should also perform suspicious activities monitoring to eliminate unauthorized or nefarious access to the virtual systems. Although, this type of monitoring is an important security feature of the CIRM, it can also be a means of full access to the virtual systems of the cloud. In an embodiment, mitigating mishandling of the CIRM or the cloud is mitigated by ensuring the logical cloud stores are segregated and the data is isolated thoroughly.

The notion of the virtual machine sitting on top of a lightweight hypervisor is a relatively new paradigm for forensic practitioners. However, it is a near-ubiquitous certainty for most IaaS infrastructures. Traditional forensic techniques, based on assumptions that the file-system was directly interacting with the hardware through an abstraction, afforded the forensic practitioner the assumption that there was nothing controlling the application below the file-system. However, this is not the case when using virtualized technologies. It is an insight of this disclosure that hypervisors have the ability to transparently monitor, introspect and interact with the guest in a non-intrusive fashion.

In an aspect, there are four key areas that monitoring and collecting data from the hypervisor would assist in alleviating:

First is the need to process entire large storage pools used by the IaaS infrastructure. Storage solutions in the cloud are varied. To support a variety of formats, e.g., Fiber Chanel, Ethernet iSCSI, and a variety of file system types, raw data can be petabytes in size. The VMs often exist in some "sharded" (striped) fashion on the file system. Current forensic tools are unable to collect data from a large data volume in a timely fashion, nor can the companies who host these services afford to take the storage system offline in order to gather forensically sound evidence from the underlying file systems. It is an insight of this disclosure that if one were to move processing to the hypervisor to gather all the file system artifacts-then all the Input/Output (IO) is decoded, saved and archived before being written to the distributed file system.

Second, the ephemerality of the guests and of cloud computing is a challenging problem, raising many issues regarding the lifetime of a particular device. The lifetime is no longer years or months, but rather it is weeks at best. Storage issues are one of the greatest challenges of cloud computing; as demand for resources increases, the cloud provider's ability to store all of a particular user's information for weeks, or even months, becomes economically unfeasible. As space is reclaimed, forensic evidence is lost. As an alternative, an emerging enterprise trend is to have users use transient clients and to store user profiles at a separate location. But, as virtual machines are cleaned and reimaged, all potential for evidence residing on the original virtual machine is lost. Some IaaS cloud platforms such as OpenStack and Amazon EC2 have mapping knowledge of where guests are deployed. It is an insight of this disclosure that given that information, it is possible to do targeted collection by the hypervisor, making it possible to collect artifacts from a guest while it is still running. It is possible to get information regarding file I/O, memory, processes, network connections as well as traceability of the actions on the system.

The third area is the elasticity of the collection methods and processing of the data. It is an insight of this disclosure that by collecting data from individual hosts, the approach scales with the cloud. No longer does forensic analysis or artifact collection focus on a single host; every host that may have information can assist in the collection and processing of the forensic artifacts.

Fourth is forensic collection and time correlation of the guest artifacts make it hard to prove the provenance of the artifacts. It is an insight of this disclosure that by collecting the artifacts from the hypervisor, it is possible to independently verify all the logs, access and interactions from the guest and create a forensic timeline of the event that is grounded with a trusted time source.

In the domain of computer networking, virtual switching was devised as a means to support networking of virtual machines on a single compute node, or host. A virtual switch is essentially a kernel process executed on the host, often in collusion with a hypervisor, to provide virtual interfaces (Ethernet segments) to virtual machines and switching/forwarding logic between interfaces. The applications derived from virtual switching can be as simple as bridges, performing layer-2 forwarding operations, or as complex as multilayer forwarding and routing functions and protocols, as well as supporting newer approaches to networking, such as software-defined networking and network function virtualization.

Figure 2:
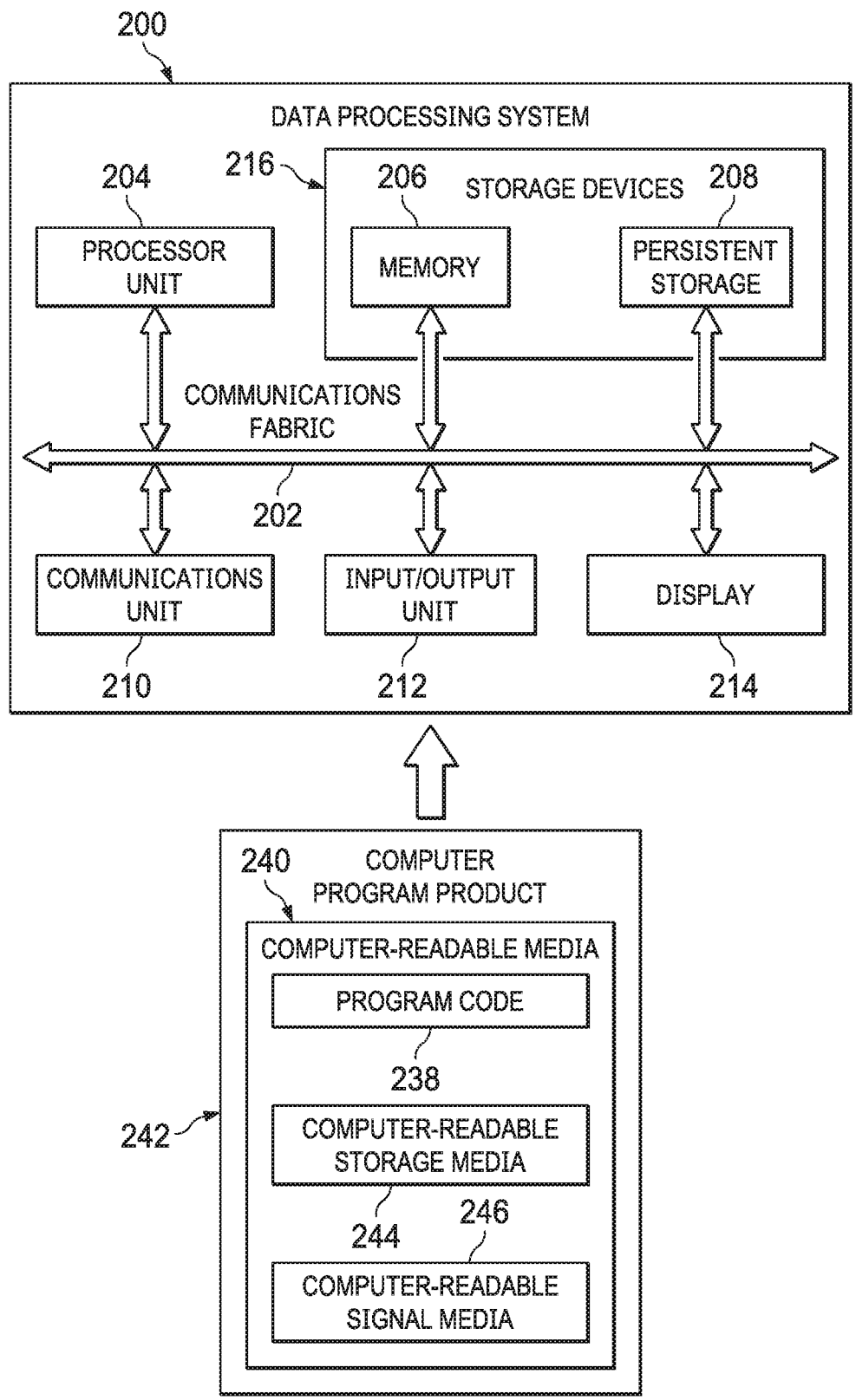
FIG. 2 is a diagram of a data processing system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, computers with high-speed connections to network 102. In addition, server 104 and server 106 may provide a set of activity consequence prediction services. For example, server 104 and server 106 may automatically predict probable consequences of activities corresponding to an event based on cognitive modeling and generate action step recommendations to eliminate or reduce impact of the probable consequences of the activities. Further, it should be noted that server 104 and server 106 may each represent a cluster of computers in a data center hosting a plurality of activity consequence prediction services. Alternatively, server 104 and server 106 may represent computer nodes in a cloud environment that provides hosting to guest clients.

Client 110, client 112, and client 114 also connect to network 102. Clients 110, 112, and 114 are clients of server 104 and server 106. In this example, clients 110, 112, and 114 are illustrated as desktop or personal computers with wire communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, smart televisions, and the like, with wire or wireless communication links to network 102. Users of clients 110, 112, and 114 may utilize clients 110, 112, and 114 to access the activity consequence prediction services provided by server 104 and server 106.

Storage 108 is a network storage device capable of storing any type of data in a structured format or an unstructured format. In addition, storage 108 may represent a plurality of network storage devices. Further, storage 108 may store, for example, identifiers for a plurality of different client devices and client device users; identifiers for a plurality of different data sources; lists of events corresponding to different client device users; activity information corresponding to listed events; detected activity patterns in the collected information; activity context information extracted from the collected information; and the like. Furthermore, storage unit 108 may store other types of data, such as authentication or credential data that may include user names, passwords, and biometric data associated with client device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

As used herein, "a number of" when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as sever 104 in FIG. 1, in which computer readable program code or instructions implementing processes of illustrative embodiments may be located. Alternatively, data processing system 200 may be implemented in a robotic device. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores CIRM 218 and a hypervisor 220. Hypervisor 220 manages VM1 222, VM2 224, and VM3 226. However, it should be noted that even though CIRM 218 and hypervisor 220 are illustrated as residing in persistent storage 208, in an alternative illustrative embodiment CIRM 218 and/or hypervisor 220 may be a separate component of data processing system 200. For example, CIRM 218 and/or hypervisor 220 may be a hardware component coupled to communication fabric 202 or a combination of hardware and software components.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a microphone, a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

In an embodiment, the persistent storage 208 stores the instructions for executing a CIRM one or more hypervisors, and/or one or more VMs.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
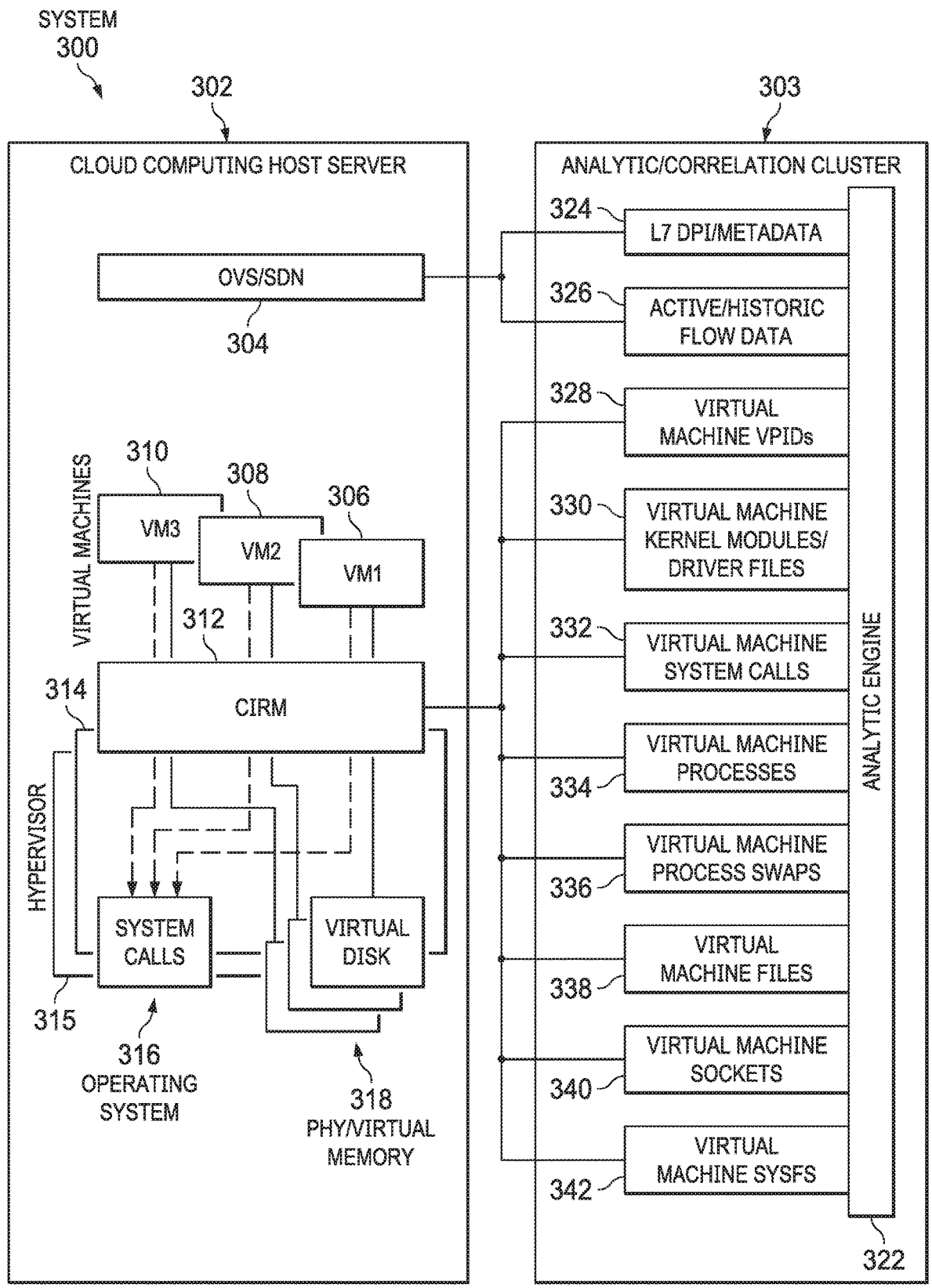
FIG. 3 is a block diagram of an exemplary embodiment of a system for cloud incident and response monitoring.

FIG. 3 is a block diagram of an exemplary embodiment of a system 300 for cloud incident and response monitoring. FIG. 3 depicts a high-level diagram of a notional infrastructure for the CIRM and network forensic tools in a cloud and analytic environment. The architecture of system 300 is fluid and is agnostic of the types of operating systems, virtual machines, and hypervisors such that the system 300 can be supported on one or many cloud computing host servers 302 of varying architectures.

System 300 includes a cloud computing host server 302 and an analytic/correlation cluster 303. The cloud computing host server 302 includes a plurality of hypervisors 314, 315 and a plurality of VMs 306, 308, 310. The cloud computing host server 302 also includes an operating system 316 and physical/virtual memory 318. Additionally, the cloud computing host server 302 includes a virtual switching mechanism (OVS), coupled with a Software Defined Networking (OVS/SDN) component 304 and a CIRM 312.

The analytic/correlation cluster 303 includes an analytic engine 322 for collecting and analyzing data from the CIRM 312 and the OVS/SDN 304. The data collected from the CIRM 312 and the OVS/SDN 304 includes L7 DPI/metadata 324, Active/Historic flow data 326, VM VPIDs 328, VM kernel modules/driver files 330, VM system calls 332, VM processes 334, VM machine process swaps 336, VM files 338, VM sockets 340, and VM sysfs 342.

One method for conducting networking monitoring at the application layer, to provide greater visibility and correlation of network traffic to VMI is implemented in C-code for the open-source virtual switch, Open vSwitch (OVS). Traffic classification leverages several libraries, provided through via a catalog of plugins and network traffic signatures covering human-initiated and machine-controlled protocols/applications. Examples of metadata is extracted from DPI include (but not limited to) HTTP (request, servers, URIs, MIME types), DNS (hosts, queries, servers), SMTP (mail-from, header), Kerberos (login, server), LDAP (hostname), etc.

Output from classification and metadata extraction are output to agnostically-formatted log files that may then be ingested by security information and event management (SIEM) systems and/or logging/analysis engines by analytic engine 322. These data are correlated against log data output from the CIRM 312 character devices may be ingested by an analytic engine 322 to provide a rich set of analytics. When coupled with network-based data introspection, a full view of historical and current state of VMs 306, 308, 310 and their interactions with other entities (either in the cloud ecosystem or external) may be captured and inspected.

Figure 4:
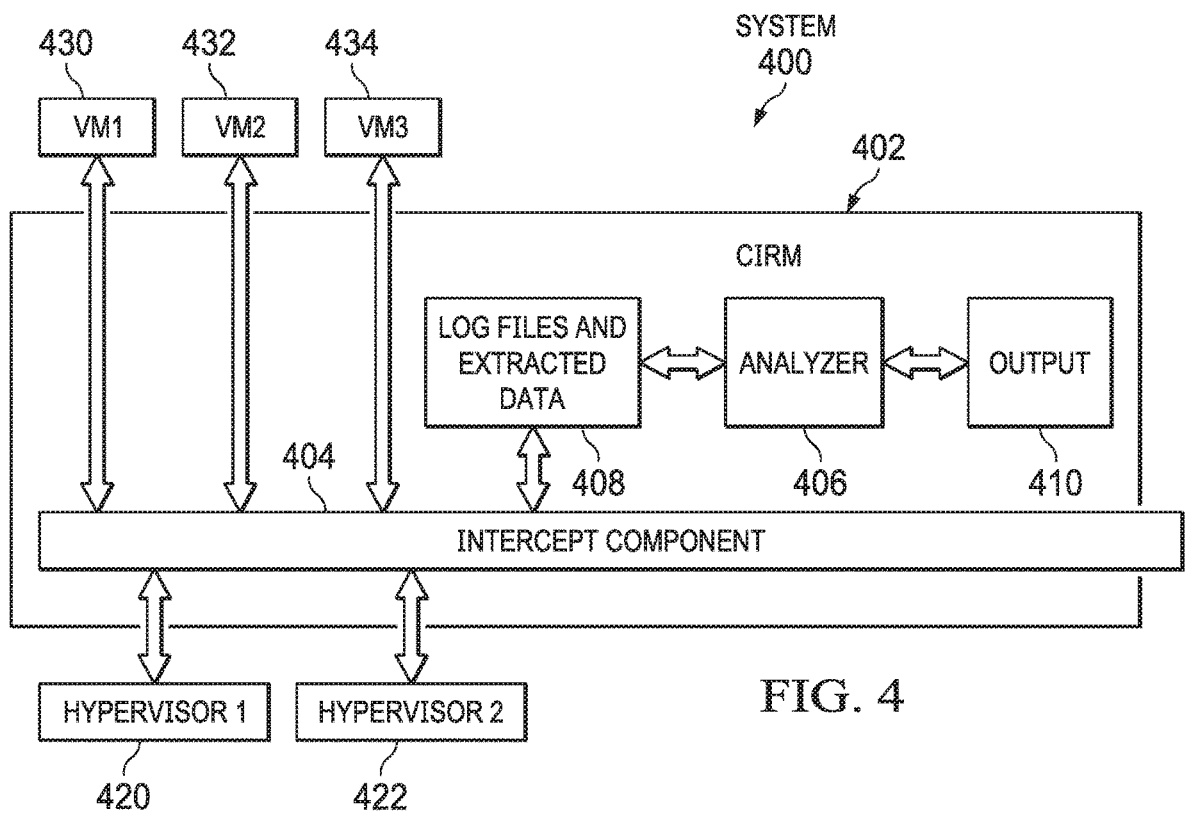
FIG. 4 is a block diagram of an exemplary embodiment of a system for cloud incident monitoring and response.

With reference now to FIG. 4, a block diagram of a system 400 for cloud incident monitoring and response is depicted in accordance with an illustrative embodiment. In this illustrative example, system 400 includes components that can be implemented in hardware such as the hardware shown in network data processing system 100 in FIG. 1.

System 400 includes a CIRM 402. The CIRM 402 includes an intercept component 404, an analyzer 406, a log files and extracted data component 408, and an output component 410. The intercept component 404 intercepts communication between VM1 430, VM2 432, and VM3 434 and hypervisor-1 420 and hypervisor-2 422. In an embodiment, hypervisor-1 420 controls and communicates with VM1 430 and VM2 432 and hypervisor-2 422 controls and communicates with VM3 434. The intercept component 404 is loadable onto multiple hypervisors 420, 422. No prior knowledge of the hypervisor 420, 422 is needed and no prior knowledge of the VM 430, 432, 434 (i.e., guest) is needed by the CIRM 402. The intercept component 404 is loadable and unloadable without VM or hypervisor interruption, e.g., the intercept component 404 is not detected by the VMs 430, 432, 434 and the VMs 430, 432, 434 (nor their users) will not know that their actions are being logged and/or otherwise collected. The output of the intercept component 404 and the analyzer 406 are unified across hypervisors 420, 422 and VMs 430, 432, 434. The intercepting and the extracting are transparent to the VMs 430, 432, 434 and to the hypervisors 420, 422. Furthermore, the intercepting and the extracting are independent of the VMs 430, 432, 434 and the hypervisors 420, 422 and any other operating environment of the VMs 430, 432, 434 and the hypervisors 420, 422, including applications, etc. Thus, the intercepting and the extracting are performed with zero knowledge of the operating environment of the VM, the hypervisor, the applications, the guest, etc. In other words, the intercept component 404 intercepts and extracts data without knowing what type or version of VM 430, 432, 434 or type or version of hypervisor 420, 422 are involved. In an embodiment, the intercepting and extracting are performed without interruption of the VMs 430, 432, 434 and the hypervisors 420, 422. In an embodiment, the intercepting and/or the extracting are performed in accordance with a forensic policy. In an embodiment, the forensic policy specifies the type of data to be extracted and/or from which guest data is to be extracted. In an embodiment, the forensic policy specifies a time frame over which the data is to be extracted. The forensic policy may include multiple filters or specifications for multiple users, multiple time frames, and multiple types of data. The forensic policy allows the use of the CIRM 402 to be customized to focus on a specific type of problem or area of concern. It also allows the CIRM 402 to be utilized in conjunction with law enforcement in cases where court orders or search warrants are required where the scope of the search is limited to what is specified by the court.

The CIRM 402 intercepts communications between the VMs 430, 432, 434 and the hypervisors 420, 422, extracts data from the intercepted communications and stores the extracted data in log files and extracted data component 408. In an embodiment, the CIRM reconstruct binary data from the extracted data and analyzes the binary data to extract forensic information. In an embodiment, the extracted data is collected and/or exported in a unified manner. In other words, in an embodiment, the CIRM 402 is configured to load on multiple hypervisors and collect from several guests, but the data is collected, stored, and/or presented in a unified view such that it looks and feels as all the data is collected the same and is correlated the same independent of the particular hypervisor or guests. Such a unified view allows one to create uniform analytics and, when running in the cloud, a unified output can be created.

In an embodiment, the analyzer 406 analyzes the data in the log files and extracted date component 408 and performs correlation of data with other data, analyzes the data for security threats, and scans the data for indications of criminal activity. The analyzer 406 outputs analyzed data to output component 410 which may present the analyzed data to a user. In an embodiment, the analyzer 406 collects structured and unstructured textual and binary data, performing correlation of related data across the pooled database. Analyses of the data for criminal, anomalous, or threat indicators are accomplished by leveraging pattern recognition tool-chains with known signatures, statistical analysis and inference techniques, or human-based queries against the datasets using regular expressions.

System 400 can be implemented as part of Virtual Desktop Infrastructures (VDI) or a Desktop-as-a-Service (DaaS). VDI and DaaS are variants of Cloud-based technology that utilize hypervisors/emulators to provide virtualized operating environments for desktop users. They too can be instrumented to provide information to the CIRM.

System 400 may be implemented in software, hardware, firmware or a combination thereof. When software is used, the operations performed by system 400 may be implemented in program code configured to run on hardware, such as a processor unit. When firmware is used, the operations performed by system 400 may be implemented in program code and data and stored in persistent memory to run on a processor unit. When hardware is employed, the hardware may include circuits that operate to perform the operations in system 400.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Computer system 400 is a physical hardware system and includes one or more data processing systems. When more than one data processing system is present in computer system 400, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with performing forensics in a cloud environment. As a result, one or more technical solutions may provide a technical effect of providing forensic tools for identifying threats to a cloud computing system and/or identifying criminal behavior.

As a result, computer system 400 operate as a special purpose computer system in which component 402 in computer system 400 enables cloud forensic analysis and response. In particular, CIRM 402 transforms computer system 400 into a special purpose computer system as compared to currently available general computer systems that do not have CIRM 402.

Computer system 400 performs a transformation of data from data exchanged between a VM and a hypervisor that allow the VM to function into forensic data such that the system 400 may be monitored and analyzed forensically for incidents, hacking, etc. such that the data has a different function or has a different use.

The illustration of system 400 in FIG. 4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
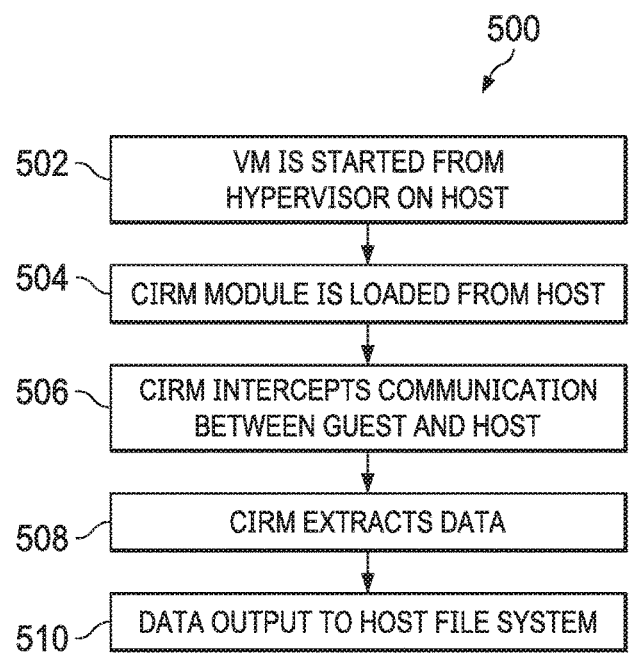
FIG. 5 is a flowchart of a method for cloud incident monitoring and response in accordance with an illustrative embodiment.

Turning next to FIG. 5, a flowchart of a method 500 for cloud incident monitoring and response is depicted in accordance with an illustrative embodiment. The processes in FIG. 5 can be implemented in hardware, software, or both. When implemented in software, the processes can take the form of program code that is run by one of more processor units located in one or more hardware devices in one or more computer systems. For example, these processes can be implemented in component 402 running on computer system 400 in FIG. 4.

The method 500 begins when a VM, such as one of VMs 430, 432, 434, is started from a hypervisor, such as one of hypervisors 420, 422, on a host. (step 502). Next, a CIRM, such as CIRM 402, is loaded from the host (step 504). After the CIRM module has been loaded, the CIRM intercepts communication between the guest (i.e., VM) and the host hypervisor (step 506). In an embodiment, in order to intercept communication between the guest and the host, the CIRM hooks the VM-Exit handler. The CIRM dynamically detects the operating system of the VM. The CIRM generates an internal representation of the VM state and extracts content and/or modifies the state. The CIRM then releases control back to the hypervisor or releases control back to the guest depending on which entity originally had control.

After intercepting communications, the CIRM extracts data from the communications (step 508). In an embodiment, the CIRM can extract the data automatically or can extract data specified through code or through a CIRM command line. The data can be extracted based on forensic parameters. The forensic parameters may specify the type of data that is important for a particular type of forensic analysis. For example, a forensic analysis team may be looking at the actions of a specific user to determine if that user is breaching security or engaged in criminal activity.

After extracting the data, the data is output to a host file system (step 510). In an embodiment, binary data is reconstructed and output to a host file system. The binary data may be archived/stored and/or analyzed. In an embodiment, the extracted data is textual data that is output to the host file system. The textual data may be consumed by SIEM. The textual data may also be correlated against other data in the STEM. STEM is an example of an analyzer, such as analyzer 406.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

To evaluate the efficacy and applicability of the CIRM tool for cloud forensics, three areas or use cases were identified for experimentation and analysis. The first involves the reconstruction of files placed or executed on targeted machines, to be used as forensic evidence. The second involves monitoring and gathering intelligence for attacks in progress, to include network traffic. The final experiment involves the ability to collect general VMI and network data for historical purposes, in a multitenant environment. The results of the use case testing elucidate the strengths and weaknesses in each situation, and possible means for improvement. The testing environment was comprised of the following hardware and software elements:

Supermicro servers
264 GB RAM•32 CPUs (Intel® Xeon® CPU E5-2670 @ 2.60 GHz)
Ubuntu 14.04.02 LTS (kernel 3.13.0-57)
KVM/QEMU 2.3.50

Use Case 1: VM as a Platform for Attackers

The purpose of this experiment is to verify the extraction of various forensic artifacts from the system without adversely affecting the guest and without guest detection of the introspection. The underlying concept addresses intellectual property theft, child pornography, etc.

1) Experiment Method: A light weight agent was created that could download files to the guest through a web interface, and then saved them to disk. This would mimic a variety of content being shared (such as child pornographic images, sensitive proprietary information, etc.); typical of what would be transferred and accessed through the Cloud. To conduct the experiment, the same file was used for download in experiments consisting of 1, 10 and 25 virtual machines on a single host. Time ticks were counted during each of the downloads to identify time differences between baseline (that is, without the CIRM extracting the file) and with the CIRM sysfs functionality enabled.

2) Results: As mentioned in the description of CIRM, the CIRM kernel module is attached to the hypervisor; hence, its existence is not visible from inside the guest (unlike agent-based solutions). Thus, the only indicator of visibility from inside the guest might be through timing analysis. For the experiment of concurrently downloading a pdf file with 1, 10 and 25 VMs on a host, the time in millions of CPU ticks for the download are show in the box plots 600, 602, 604 in FIGS. 6A, 6B, and 6C. Each download was run 30 times on each VM instance.

Figure 6A:
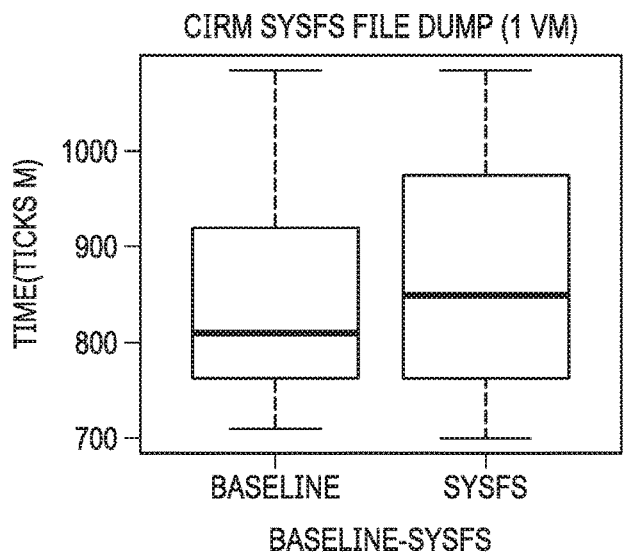
FIGS. 6A, 6B, and 6C show a comparison of download times of concurrently downloading a pdf file with 1, 10 and 25 VMs on a host using the disclosed CIRM and without the disclosed CIRM.
Figure 6B:
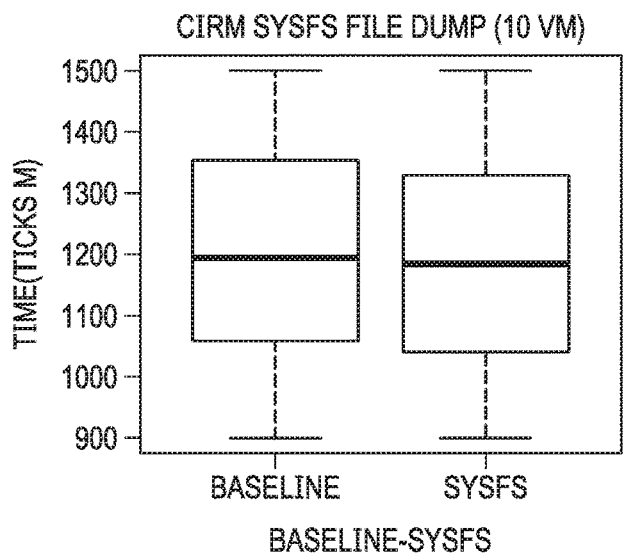
Figure 6C:
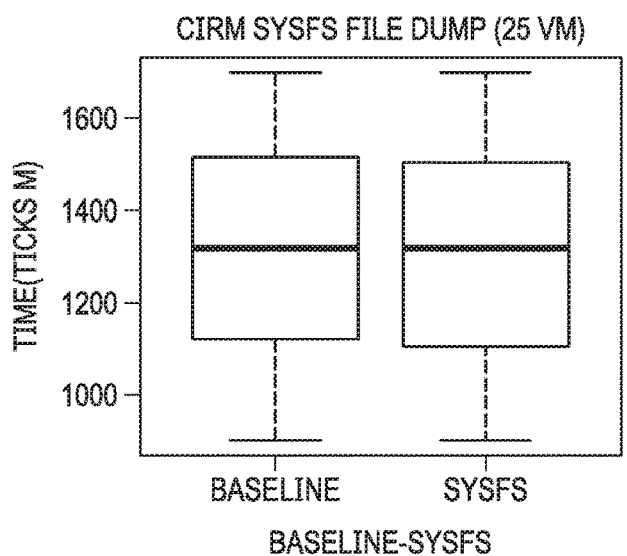

As can be seen in the plots in FIGS. 6A, 6B, and 6C, there is negligible difference in the time ticks between the downloads (growing more consistent with the greater number of samples). Also, it should be noted that the sysfs process was also able to extract the file before it reaches the disk encryption process for NTFS; md5sums were also taken to show the pdf extracted was the same downloaded.

Use Case 2: VM used as an Exploited Endpoint

The purpose of this experiment is to help identify anomalous guest processes or to identify "stealthy" malware (process hiding techniques). These are both techniques that could be used by a malicious user's attempt to hide their actions through covert means. The process information would then be correlated to network traffic supporting C2-like operations. The underlying concept here represents a typical drive-by download attack against a VM to include exploitation and pivoting.

1) Experiment Method: A user on a VM would visit a "malicious" website, that would then exploit a browser vulnerability, providing the attacker privileged control of the virtual machine. At this time, the attack would then pivot to other machines in the network, using metasploit to gain passwords.

2) Results: This particular experiment makes use of the CIRM to introspect on guest VMs, and network forensic tools (as described above) to correlate guest data to network data. The results of the experiment largely focus on log data to navigate the attack in real time and identify the actions done on the target VM. By logging the cloud computing host server, virtual machine name/ID, and IP addresses, the VM in multitenancy can be quickly identified. The CIRM includes data pulled form Windows APIs, with parameters. The collection of guess and network data address the semantic-gap problem of pulling context from the guest to the host.

To start the experiment, an administrator logs into a VM (0.82) and adds a share using domain admin credentials. He then visits a phishing website hosted on the attacker's machine ("attack.com", 0.2). This is shown in a network forensic log 702 of FIG. 7A as a DNS request to the DNS/domain controller server at 0.66.

The attacker compromises the VM (0.82) using a Silverlight Exploit through a XAP file and runs a bind meterpreter on port 2222 as shown in the forensic log 704 of FIG. 7B.

The attacker then starts a new process, notepad.exe, and migrates to the process so if the user closes iexplore.exe it won't close the meterpreter session as shown in the forensic log 706 of FIG. 7C.

The attacker then uploads a binary and executes it. The binary is seen in the forensic log 708 of FIG. 7D, and also from the guest to the host for further inspection.

The attacker then exfils a file from the compromised VM's desktop to the attacker machine, we see this process started by a walk of the directory tree as shown in the forensic log 710 in FIG. 7E.

The attacker then collects the local SAM hashes on the machine and passwords located in memory (kerberos, msv, and ssp passwords). As this information is transferred back to the attacker machine, high entropy URIs are seen in the DPI log 712 in FIG. 7F over a meterpreter bound port 2222.

Using the newly found credentials, the attacker logs into the domain controller (DC) (0.66). On the DC the attacker again collects passwords and domain password hashes. Hashed URIs are shown traversing port 2222 from the AD to the Attacker server, as well as exfil communication from the AD to the attacker over port 3333 as shown in the forensic log 714 in FIG. 7G.

The final use-case examines the situation wherein an internet-connected node might be used a listening-post or a botnet drone waiting C2 commands. The underlying concept involves a targeted VM that is conscripted, running both legitimate and non-legitimate traffic/services.

1) Experiment Method: Several connections from the VM are made, combining both normal applications and malicious applications (as denoted by the experimenters).

2) Results: Using the CIRM sockets monitoring feature, the VM making connections and the endpoints (IPs) to which connections are made can be identified. One insight of this disclosure is the binding of the network connection to the requesting application. As can be seen in the CIRM socket log 716 of FIG. 7H, the VM (host process id 0xC27) can be seen making connections to IP 0.33 over port 80, with the process iexplorer.exe (Internet Explorer).

Thus, illustrative embodiments of the present invention provide a computer implemented method, computer system, and computer program product for incident response and forensic analysis in a cloud computing environment. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for performing cloud forensics and incident response, the computer-implemented method comprising:
   intercepting, by a cloud incident response module (CIRM), communication between a virtual machine (VM) and a hypervisor; and
   extracting, by the CIRM, data from the communication between the VM and the hypervisor according to a forensic policy,
   wherein intercepting and the extracting are transparent to the VM and to the hypervisor,
   wherein the intercepting and the extracting are performed without knowledge of the VM and of the hypervisor, and
   wherein the intercepting and the extracting are performed independent of the VM.

2. The method of claim 1, wherein the VM comprises a first VM, wherein the hypervisor comprises a first hypervisor, wherein the communication comprises a first communication, and wherein the data comprises a first data, further comprising:
   intercepting, by the CIRM, second communication between a second VM and a second hypervisor; and
   extracting, by the CIRM, second data from the second communication between the second VM and the second hypervisor.

3. The method of claim 2, further comprising collecting and exporting the first and second data in a unified manner that is independent of the first and second VMs and independent of the first and second hypervisors.

4. The method of claim 1, further comprising:
   reconstructing binary data from the extracted data; and
   analyzing the binary data to extract forensic information.

5. The method of claim 1, wherein the data comprises textual data and further comprising:
   correlating the textual data against other data in a security information and event management (SIEM) system.

6. The method of claim 1, wherein the intercepting and extracting are performed without interruption of the VM and the hypervisor.

7. The method of claim 1, further comprising:
   detecting an operating system of the VM.

8. The method of claim 1, wherein the forensic policy comprises at least one of an identifying a guest for which data is to be extracted, identifying a type of data to be extracted, and identifying a time frame within which data is to be extracted.

9. The method of claim 1, further comprising:
   locating, by the CIRM, hypervisor in kernel-space memory; and
   redirecting exit handling of the VM from the hypervisor to a CIRM exit handler.

10. The method of claim 1, wherein the CIRM is loadable and unloadable without VM or hypervisor interruption.

11. The method of claim 1, wherein an output from the CIRM is unified across a plurality of hypervisors and a plurality of VMs.

12. A computer system for performing cloud forensics and incident response, the computer system comprising:
    a bus system;
    a storage device connected to the bus system, wherein the storage device stores program instructions; and
    a processor connected to the bus system, wherein the processor executes the program instructions to:
        intercept communication between a virtual machine (VM) and a hypervisor; and
        extract data from the communication between the VM and the hypervisor according to a forensic policy,
        wherein executing the instructions to intercept and to extract are transparent to the VM and to the hypervisor,
        wherein executing the instructions to intercept and extract are performed without knowledge of the VM and of the hypervisor, and
        wherein the intercepting and the extracting are performed independent of the VM.

13. The computer system of claim 12, wherein the VM comprises a first VM, wherein the hypervisor comprises a first hypervisor, wherein the communication comprises a first communication, wherein the data comprises a first data, and wherein the processor further executes the program instructions to:
    intercept second communication between a second VM and a second hypervisor; and
    extract second data from the second communication between the second VM and the second hypervisor.

14. The computer system of claim 12, wherein the processor further executes the program instructions to:
    reconstruct binary data from the extracted data; and
    analyze the binary data to extract forensic information.

15. The computer system of claim 12, wherein the data comprises textual data and wherein the processor further executes the program instructions to:
    correlate the textual data against other data in a security information and event management (SIEM) system.

16. The computer system of claim 12, wherein the instructions to intercept and the instructions to extract are performed without interruption of the VM and the hypervisor.

17. A computer program product for performing cloud forensics and incident response, the computer program product comprising a computer readable storage medium having program instructions embodied therewith, the program instructions executable by a computer to cause the computer to perform a method comprising:
    intercepting communication between a virtual machine (VM) and a hypervisor; and
    extracting data from the communication between the VM and the hypervisor according to a forensic policy, wherein intercepting and the extracting are transparent to the VM and to the hypervisor,
wherein the intercepting and the extracting are performed without knowledge of the VM and of the hypervisor, and
wherein the intercepting and the extracting are performed independent of the VM.

18. The computer program product of claim 17, wherein the VM comprises a first VM, wherein the hypervisor comprises a first hypervisor, wherein the communication comprises a first communication, wherein the data comprises a first data, and wherein the method further comprises:
intercepting second communication between a second VM and a second hypervisor; and
extracting second data from the second communication between the second VM and the second hypervisor.

19. The computer program product of claim 17, wherein the method further comprises:
reconstructing binary data from the extracted data; and
analyzing the binary data to extract forensic information.

20. The computer program product of claim 17, wherein the data comprises textual data and wherein the method further comprises:
correlating the textual data against other data in a security information and event management (SIEM) system.

21. The computer program product of claim 17, wherein the method for intercepting and extracting are performed without interruption of the VM and the hypervisor.

* * * * *